(12) United States Patent
Elkovitch et al.

(10) Patent No.: US 7,118,691 B2
(45) Date of Patent: Oct. 10, 2006

(54) POLY(ARYLENE ETHER)/POLYAMIDE COMPOSITION

(75) Inventors: Mark D. Elkovitch, Selkirk, NY (US); James Ross Fishburn, Slingerlands, NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 10/909,078

(22) Filed: Jul. 30, 2004

(65) Prior Publication Data

US 2005/0038159 A1    Feb. 17, 2005

Related U.S. Application Data

(60) Provisional application No. 60/495,357, filed on Aug. 16, 2003.

(51) Int. Cl.
C08L 77/00   (2006.01)

(52) U.S. Cl. ............. 252/500; 524/504; 524/505; 524/508; 524/514; 525/66; 525/92 B; 525/391; 525/397

(58) Field of Classification Search ......... 524/504, 524/514, 505, 508; 525/397, 391, 92 B, 525/66; 252/500

See application file for complete search history.

(56) References Cited

U.S. PATENT DOCUMENTS

| | | |
|---|---|---|
| 4,315,086 A | 2/1982 | Uenon et al. |
| 4,600,741 A | 7/1986 | Aycock et al. |
| 4,659,760 A | 4/1987 | Van der Meer |
| 4,732,938 A | 3/1988 | Grant et al. |
| 4,745,157 A | 5/1988 | Yates, III et al. |
| 4,798,865 A | 1/1989 | Grant et al. |
| 4,808,671 A | 2/1989 | Sivavec |
| 4,826,933 A | 5/1989 | Grant et al. |
| 4,859,739 A | 8/1989 | Yates, III et al. |
| 4,863,966 A | 9/1989 | Black et al. |
| 4,863,996 A | 9/1989 | Nakazima et al. |
| 4,873,276 A * | 10/1989 | Fujii et al. .............. 524/153 |
| 4,873,286 A | 10/1989 | Gallucci et al. |
| 4,874,810 A | 10/1989 | Lee, Jr. et al. |
| 4,923,924 A | 5/1990 | Grant et al. |
| 4,929,675 A | 5/1990 | Abe et al. |
| 4,957,966 A | 9/1990 | Nishio et al. |
| 4,960,825 A | 10/1990 | Van der Meer |
| 4,963,620 A | 10/1990 | Grant et al. |
| 4,994,525 A | 2/1991 | Brown et al. |
| 4,997,612 A | 3/1991 | Gianchandai et al. |
| 5,000,897 A | 3/1991 | Chambers |
| 5,059,646 A | 10/1991 | Morioka et al. |
| 5,086,105 A | 2/1992 | Abe et al. |
| 5,104,937 A | 4/1992 | Saito et al. |
| 5,104,939 A | 4/1992 | Van der Meer et al. |
| 5,109,052 A | 4/1992 | Kasai et al. |
| 5,109,065 A | 4/1992 | Saito et al. |
| 5,122,576 A | 6/1992 | White et al. |
| 5,132,365 A | 7/1992 | Gallucci |
| 5,134,196 A | 7/1992 | Van der Meer |
| 5,135,983 A | 8/1992 | Morioka |
| 5,162,433 A | 11/1992 | Nishio et al. |
| 5,237,002 A | 8/1993 | Nishio et al. |
| 5,248,728 A | 9/1993 | Lee, Jr. |
| 5,260,359 A | 11/1993 | Muehlbach et al. |
| 5,260,374 A | 11/1993 | Gallucci |
| 5,288,786 A | 2/1994 | Nishio et al. |
| 5,296,533 A | 3/1994 | Nagaoka et al. |
| 5,304,593 A | 4/1994 | Nishio et al. |
| 5,310,821 A | 5/1994 | Kodaira et al. |
| 5,324,782 A | 6/1994 | Lee, Jr. |
| 5,334,636 A | 8/1994 | Fujii et al. |
| 5,397,838 A | 3/1995 | Ohtomo et al. |
| 5,403,888 A | 4/1995 | Nishio et al. |
| 5,405,902 A | 4/1995 | Nishio et al. |
| 5,470,902 A | 11/1995 | Kubo et al. |
| 5,470,913 A | 11/1995 | Van der Meer et al. |
| 5,475,049 A | 12/1995 | Ohtomo et al. |
| 5,506,305 A | 4/1996 | Nagaoka et al. |
| 5,521,244 A | 5/1996 | Yates et al. |
| 5,554,693 A | 9/1996 | Ohtomo et al. |
| 5,719,233 A | 2/1998 | Gallucci et al. |
| 5,723,539 A | 3/1998 | Gallucci et al. |
| 5,741,846 A | 4/1998 | Lohmeijer et al. |
| 5,760,125 A | 6/1998 | Ohtomo et al. |
| 5,859,130 A | 1/1999 | Gianchandai et al. |
| 5,859,176 A | 1/1999 | Nakahashi et al. |
| 5,916,970 A | 6/1999 | Lee, Jr. et al. |

(Continued)

FOREIGN PATENT DOCUMENTS

EP    1 024 171    1/2000

(Continued)

OTHER PUBLICATIONS

JP2004-083792. Application Date 2004-083792 (Machine Translation).

(Continued)

Primary Examiner—Ana Woodward

(57) ABSTRACT

A composition comprises an impact modifier and a compatibilized blend of a poly(arylene ether) and an aliphatic-aromatic polyamide. The polyamide is composed of dicarboxylic acid units comprising 60 to 100 mol % of terephthalic acid units and diamine units comprising 60 to 100 mol % of 1,9-nonanediamine units and/or 2-methyl-1,8-octanediamine units. The aliphatic-aromatic polyamide has a melt viscosity greater than or equal to 2000 Pa-s at a shear of 1000 second$^{-1}$ and a temperature of 330° C. and the composition has a melt viscosity greater than or equal to 160 Pascal seconds (Pa-s) at a shear of 1500 second$^{-1}$ (s$^{-1}$) and a temperature of 330° C.

16 Claims, No Drawings

U.S. PATENT DOCUMENTS

| | | | |
|---|---|---|---|
| 5,977,240 | A | 11/1999 | Marie Lohmeijer et al. |
| 6,171,523 | B1 | 1/2001 | Silvi et al. |
| 6,180,716 | B1 | 1/2001 | Majumdar |
| 6,319,986 | B1 | 11/2001 | Amimoto et al. |
| 6,362,263 | B1 | 3/2002 | Brown et al. |
| 2003/0023008 | A1 | 1/2003 | Uchida et al. |
| 2003/0088027 | A1 | 5/2003 | Chin et al. |
| 2004/0034152 | A1 | 2/2004 | Oka et al. |

FOREIGN PATENT DOCUMENTS

| | | |
|---|---|---|
| EP | 1170335 | 7/2001 |
| EP | 1375578 | 6/2003 |
| JP | 405339496 | 12/1993 |

OTHER PUBLICATIONS

JP2000-212433. Publication Date: Feb. 8, 2000 (Machine Translation).

JP2000-212434. Publication Date: Feb. 8, 2000 (Machine Translation).

JP2004-083792. Publication Date Mar. 18, 2004. (Manual Translation).

JP1997087483A. Publication Date. Mar. 31, 1997 (Manual Translation).

JP2003 041117. Feb. 13, 2003 Abstract Only.

ASTM D 570-98 "Standard Test Method for Water Absorption of Plastics". p. 1-4.

ASTM D 256-04 "Standard Test Methods for Determining the Izod Pendulum Impact Resistance of Plastics", pp. 1-20.

ASTM D 3763-02 "Standard Test Method for High Speed Puncture Properties of Plastics Using Load and Displacement Sensors" pp. 1-10.

UL94 "Test for Flammability of Plastic Materials for Parts in Devices and Appliances" Fifth Edition Dated Oct. 29, 1996.

JP2000-212433. Publication Date Aug. 2, 2000. Manual Translation.

JP2000-212434. Publication Date Aug. 2, 2000. Manual Translation.

JP2004-083792. Publication Date Mar. 18, 2004. (Manual Translation).

JP1997087483A. Publication Date Mar. 31, 1997 (Manual Translation).

* cited by examiner

POLY(ARYLENE ETHER)/POLYAMIDE COMPOSITION

CROSS REFERENCE TO RELATED APPLICATIONS

This application claims priority to U.S. Provisional Application No. 60/495,357 filed on Aug. 16, 2003, which is incorporated by reference herein.

BACKGROUND OF INVENTION

The disclosure relates to poly(arylene ether)/polyamide compositions.

Poly(arylene ether)/aliphatic polyamide compositions are widely used and the characteristics of the compositions are a result of, at least in part, the characteristics of the poly (arylene ether) and the polyamide. Despite their wide use compositions employing aliphatic polyamides can suffer from drawbacks such as undesirably low dimensional stability, and high moisture absorption. Attempts have been made to improve the physical property profile by altering the polyamide structure to include aromatic elements. Compositions employing these aliphatic-aromatic polyamides have improved many physical properties such as heat resistance, dimensional stability and water absorption but have diminished other desirable properties. For instance, many aliphatic-aromatic polyamides have melt temperatures above the degradation temperature of many polymers. Thus these aliphatic-aromatic polyamides cannot be blended with many polymers without causing at least partial degradation of the polymer. Some aliphatic-aromatic polyamides have a melt temperature less than the degradation temperature of many polymers but these polyamides usually have inadequate dimensional stability for most applications and blends employing them typically demonstrate poor dimensional stability as well.

Additionally, poly(arylene ether)/polyamide compositions typically have at least two immiscible phases and the physical properties of the composition can be affected by the morphology of the phases.

There is a growing need for polymers and polymer blends suitable for use in low pressure/low shear processes such as blow molding, sheet extrusion and profile extrusion. Low pressure/low shear processes are significantly different from high pressure/high shear processes such as injection molding. For example, profile extrusion requires that a polymer blend be forced through a shaped die (a profile) and maintain the extruded shape until cooled. The extruded shape may be further manipulated while the polymer blend is still warm through the use of shaping tools and the shaped profile must retain its shape after manipulation. Therefore blends employed in low pressure/low shear processes typically have fairly high melt viscosity (low melt flow indices) as well as high melt strength.

Formation of a multi-phasic polymer blend having high melt viscosity and high melt strength can be difficult because the high melt viscosity can have a negative impact on the morphological relationship between the phases with a resulting negative on physical properties such as melt strength and impact strength.

Accordingly there is a need for a poly(arylene ether)/ aliphatic-aromatic polyamide composition having a combination of high melt viscosity, high melt strength and low water absorption.

BRIEF DESCRIPTION OF THE INVENTION

The above mentioned need is addressed by a composition comprising an impact modifier and a compatibilized blend of a poly(arylene ether) and an aliphatic-aromatic polyamide. The polyamide is composed of dicarboxylic acid units comprising 60 to 100 mol % of terephthalic acid units and diamine units comprising 60 to 100 mol % of 1,9-nonanediamine units and/or 2-methyl-1,8-octanediamine units. The polyamide has an amine end group content greater than 45 micromoles per gram of polyamide. The aliphatic-aromatic polyamide has a melt viscosity greater than or equal to 200 Pa-s at a shear of 1000 second$^{-1}$ and a temperature of 330° C. and the composition has a melt viscosity greater than or equal to 160 Pascal seconds (Pa-s) at a shear of 1500 second$^{-1}$ (s$^{-1}$) and a temperature of 330° C.

DETAILED DESCRIPTION

The composition disclosed herein comprises a compatibilized blend of poly(arylene ether) and an aliphatic-aromatic polyamide as well as an impact modifier. The polyamide comprises dicarboxylic acid units and diamine units. At least 60 mol % of the dicarboxylic acid units are terephthalic acid units and at least 60 mol % of the diamine units are 1,9-nonanediamine units and/or 2-methyl-1,8-octanediamine units. The combination of aromatic units and nine carbon aliphatic units results in a polyamide having a unique combination of melt temperature, low water absorption, and dimensional stability, which, when employed in a poly(arylene ether)/aliphatic-aromatic polyamide blend, results in a composition having excellent dimensional stability, impact strength and water absorption.

Importantly, the aliphatic-aromatic polyamide has a melt viscosity greater than or equal to 200 Pa-s at a shear of 1000 second$^{-1}$ and a temperature of 330° C. The composition has a melt viscosity greater than or equal to 160 Pa-s. In one embodiment the composition has a melt viscosity of 160 to 350 Pa-s at a shear rate of 1500 s$^{-1}$ and a temperature of 330° C. Within this range the melt viscosity of the composition may be greater than or equal to 170, or, more specifically, greater than or equal to 180, or, even more specifically, greater than or equal to 190. Also within this range the melt viscosity may be less than or equal to 340, or, more specifically, less than or equal to 330, or, even more specifically, less than or equal to 320. Melt viscosity is determined by capillary viscometry.

Poly(arylene ether)/aliphatic polyamide compositions with high melt viscosities comprise aliphatic polyamides having a high molecular weight and a melt temperature close to the glass transition temperature of the poly(arylene ether). The high molecular weight of the polyamide helps to increase the viscosity of the composition when melted and the fact that the melt temperature of the polyamide is close to the glass transition temperature of the poly(arylene ether) is believed to prevent the poly(arylene ether) from flowing and thus lowering the melt viscosity of the composition. In contrast the aliphatic-aromatic polyamide has a melt temperature significantly higher than the glass transition temperature of the poly(arylene ether). Despite this difference in melt temperature and glass transition temperature it is possible to obtain a poly(arylene ether)/aliphatic-aromatic polyamide that has a high melt viscosity.

In one embodiment the composition, in the absence of filler and/or reinforcing agents, has a coefficient of thermal expansion (CTE) of 6×10$^{-5}$ millimeters/millimeters ° C. to 9×10$^{-5}$ millimeters/millimeters ° C. as determined by ISO 11359-2 and reported at 23–60° C. Within this range the CTE may be greater than or equal to $6.2 \times 10^{-5}$ millimeters/millimeters ° C., or, more specifically, greater than or equal to $6.4 \times 10^{-5}$ millimeters/millimeters ° C. Also within this range the CTE may be less than or equal to $8.7 \times 10^{-5}$ millimeters/millimeters ° C., or, more specifically less than or equal to $8.5 \times 10^{-5}$ millimeters/millimeters ° C. Notably the composition comprising an impact modifier and poly(arylene ether)/aliphatic-aromatic polyamide has a CTE that remains substantially constant over a wider temperature range (23–100° C.) than comparable compositions comprising poly(arylene ether)/aliphatic polyamide (23–60° C.).

In one embodiment, the composition has a water absorption value less than or equal to 0.3% after 24 hours, or more specifically, less than or equal to 0.25% after 24 hours, or, even more specifically less than or equal to 0.2% after 24 hours as determined by ASTM D 570.

Impact resistance can be determined using a Notched Izod (NI) test according to ASTM D256 and a multi-axial impact test according to ASTM D3763. In one embodiment the composition has a NI value at 23° C. greater than or equal to 650 Joules per meter (J/m), or, more specifically, greater than or equal to 660, or, even more specifically, greater than or equal to 670 J/m. Additionally, the composition may have a NI at –30° C. greater than or equal to 140 J/m, or, more specifically, greater than or equal to 145 J/m, or even more specifically, greater than or equal to 150 J/m.

In one embodiment the composition has a multi-axial impact value at 23° C. greater than or equal to 50 Joules (J), or, more specifically, greater than or equal to 55, or, even more specifically, greater than or equal to 60 J. Additionally, the composition may have a multi-axial impact value at –30° C. greater than or equal to 30 J, or, more specifically, greater than or equal to 35 J, or, even more specifically, greater than or equal to 45 J. The multi-axial impact is the energy at the energy at maximum force.

In one embodiment, the composition, in the absence of filler and/or reinforcing agent, has a multi-axial loss less than or equal to 0.30, or, more specifically, less than or equal to 0.27, or, even more specifically, less than or equal to 0.25. Multi-axial loss is determined by (multi-axial value at 23° C.-multi-axial value at –30° C.)/multi-axial value at 23° C.

As used herein, a "poly(arylene ether)" comprises a plurality of structural units of the formula (I):

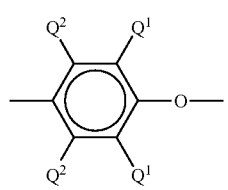

wherein for each structural unit, each $Q^1$ is independently halogen, primary or secondary lower alkyl (e.g., an alkyl containing 1 to 7 carbon atoms), phenyl, haloalkyl, aminoalkyl, alkenylalkyl, alkynylalkyl, hydrocarbonoxy, and halohydrocarbonoxy wherein at least two carbon atoms separate the halogen and oxygen atoms; and each $Q^2$ is independently hydrogen, halogen, primary or secondary lower alkyl, phenyl, haloalkyl, aminoalkyl, alkenylalkyl, alkynylalkyl, hydrocarbonoxy, halohydrocarbonoxy wherein at least two carbon atoms separate the halogen and oxygen atoms. In some embodiments, each $Q^1$ is independently alkyl or phenyl, for example, $C_{1-4}$ alkyl, and each $Q^2$ is independently hydrogen or methyl. The poly(arylene ether) may comprise molecules having aminoalkyl-containing end group(s), typically located in an ortho position to the hydroxy group. Also frequently present are 4-hydroxybiphenyl end groups, typically obtained from reaction mixtures in which a by-product diphenoquinone is present.

The poly(arylene ether) may be in the form of a homopolymer; a copolymer; a graft copolymer; an ionomer; a block copolymer, for example comprising arylene ether units and blocks derived from alkenyl aromatic compounds; as well as combinations comprising at least one of the foregoing. Poly(arylene ether) includes polyphenylene ether containing 2,6-dimethyl-1,4-phenylene ether units optionally in combination with 2,3,6-trimethyl-1,4-phenylene ether units.

The poly(arylene ether) may be prepared by the oxidative coupling of monohydroxyaromatic compound(s) such as 2,6-xylenol and/or 2,3,6-trimethylphenol. Catalyst systems are generally employed for such coupling; they can contain heavy metal compound(s) such as a copper, manganese or cobalt compound, usually in combination with various other materials such as a secondary amine, tertiary amine, halide or combination of two or more of the foregoing.

The poly(arylene ether) can have a number average molecular weight of 3,000 to 40,000 atomic mass units (amu) and a weight average molecular weight of 5,000 to 80,000 amu, as determined by gel permeation chromatography. The poly(arylene ether) can have an intrinsic viscosity of 0.10 to 0.60 deciliters per gram (dl/g), or, more specifically, 0.29 to 0.48 dl/g, as measured in chloroform at 25° C. It is possible to utilize a combination of high intrinsic viscosity poly(arylene ether) and a low intrinsic viscosity poly(arylene ether). Determining an exact ratio, when two intrinsic viscosities are used, will depend somewhat on the exact intrinsic viscosities of the poly(arylene ether) used and the ultimate physical properties that are desired.

The composition may contain poly(arylene ether) in an amount of 10 weight percent to 70 weight percent based on the combined weight of poly(arylene ether), polyamide and impact modifier. Within this range the amount of poly(arylene ether) may be greater than or equal to 15, or, more specifically, greater than or equal to 20 weight percent. Also within this range the amount of poly(arylene ether) may be less than or equal to 65, or, more specifically, less than or equal to 60 weight percent.

The aliphatic-aromatic polyamide comprises units derived from one or more dicarboxylic acid and units derived from one or more diamine. 60 to 100 mol % of the dicarboxylic acid units, based on the total moles of dicarboxylic acid units, are derived from terephthalic acid. Within this range the amount of terephthalic acid units may be greater than or equal to 75 mol %, or, more specifically, greater than or equal to 90 mol %.

Examples of other dicarboxylic acid units that may be used in addition to the terephthalic acid units include units derived from aliphatic dicarboxylic acids such as malnic acid, dimethylmalonic acid, succinic acid, glutaric acid, adipic acid, 2-trimethyladipic acid, pimelic acid, 2,2-dimethylglutaric acid, 3,3-diethylsuccinic acid, azelaic acid, sebacic acid and suberic acid; alicyclic dicarboxylic acids such as 1,3-cyclopentanedicarboxylic acid and 1,4-cyclohexanedicarboxylic acid; and aromatic dicarboxylic acids such as isophthalic acid, 2,6-naphthalenedicarboxylic acid, 2,7-naphthalenedicarboxylic acid, 1,4-naphthalenedicarboxylic acid, 1,4-phenylenedioxy-diacetic acid, 1,3-phenylenedioxy-diacetic acid, diphenic acid, 4,4'-oxydibenzoic acid, diphenylmethane-4,4'-dicarboxylic acid, diphenylsulfone-4,4'-dicarboxylic acid and 4,4'-biphenyldicarboxylic acid. These can be used singly or in combinations of two or more types. Of these, units derived from aromatic dicarboxylic acids are preferred. In one embodiment the content of these other dicarboxylic acid units in the dicarboxylic acid units (a) is less than or equal to 25 mol %, or, more specifically, less than or equal to 10 mol %. Units derived from polyfunctionalized carboxylic acids such as trimellitic acid, trimesic acid and pyromellitic acid may also be included to the extent that melt molding is still possible.

The aliphatic-aromatic polyamide comprises units derived from one or more diamines. 60 to 100 mol % of the diamine units, based on the total moles of diamine units, are derived from 1,9-nonanediamine units and/or 2-methyl-1,8-octanediamine units. Within this range the amount of 1,9-nonanediamine units and/or 2-methyl-1,8-octanediamine units may be greater than or equal to 75 mol %, or, more specifically, greater than or equal to 90 mol %.

The molar ratio of the 1,9-nonanediamine units to the 2-methyl-1,8-octanediamine units may be 100:0 to 20:80, or, more specifically, 100:0 to 50:50, or, even more specifically, 100:0 to 50:40. This can be referred to as the N/I ratio.

Examples of other diamine units that may be used in addition to the 1,9-nonanediamine units and/or 2-methyl-1, 8-octanediamine units include units derived from linear aliphatic diamines such as 1,6-hexanediamine, 1,7-heptanediamine, 1,8-octanediamine, 1,10-decanediamine, 1,11-undecanediamine and 1,12-dodecanediamine; branched aliphatic diamines such as 2-methyl-1,5-pentanediamine, 3-methyl-1,5-pentanediamine, 2,2,4-trimethyl-1,6-hexanediamine, 2,4,4-trimethyl-1,6-hexanediamine and 5-methyl-1,9-nonanediamine; alicyclic diamines such as cyclohexanediamine, methylcyclohexanediamine, isophoronediamine, bis(4-aminocyclohexyl)methane, norbornanedimethylamine and tricyclodecanedimethylamine; and aromatic diamines such as p-phenylenediamine, m-phenylenediamine, m-xylylenediamine, p-xylylenediamine, 4,4'-diaminodiphenylsulfone and 4,4'-diaminodiphenyl ether. These can be used singly or in combinations of two or more types. In one embodiment, units derived from 1,6-hexanediamine, 1,7-heptanediamine, 1,8-octanediamine, 1,10-decanediamine and/or 1,12-dodecanediamine are combined with the 1,9-nonanediamine units and/or 2-methyl-1, 8-octanediamine units.

The aliphatic-aromatic polyamide can be manufactured by any known method for manufacturing crystalline polyamides. For example, it can be manufactured by solution polymerization or interfacial polymerization in which an acid chloride and a diamine are used as raw materials, or by melt polymerization, solid-phase polymerization, or melt extrusion polymerization in which a dicarboxylic acid and a diamine are used as raw materials.

The intrinsic viscosity of the aliphatic-aromatic polyamide, measured in concentrated sulfuric acid at 30° C., may be 0.7 to 1.8 dl/g, or, more specifically, 0.9 to 1.6 dl/g, or, even more specifically, 1.1 to 1.4 dl/g.

The melt viscosity of the aliphatic-aromatic polyamide may be 200 to 300 Pascal second (Pa-s) at a shear rate of 1000 s$^{-1}$ and a temperature of 330° C., as measured by a capillary viscometer. Within this range, the melt viscosity may be greater than or equal to 210, or, more specifically, greater than or equal to 220 Pa-s. Also within this range, the melt viscosity may be less than or equal to 380, or, more specifically, less than or equal to 360 Pa-s.

The aliphatic-aromatic polyamide has an amine end group content greater than or equal to 45 micromoles per gram of polyamide, or more specifically, greater than or equal to 50 micromoles, or, even more specifically, greater than or equal to 55 micromoles per gram of polyamide. Amine end group content may be determined by dissolving the polyamide in a suitable solvent, optionally with heat. The polyamide solution is titrated with 0.01 Normal hydrochloric acid (HCl) solution using a suitable indication method. The amount of amine end groups is calculated based the volume of HCl solution added to the sample, the volume of HCl used for the blank, the molarity of the HCl solution and the weight of the polyamide sample.

The compatibilized blend may additionally comprise an aliphatic polyamide such as nylon 6, 6/6, 6/69, 6/10, 6/12, 11, 12, 4/6, 6/3, 7, 8, 6T, modified 6T, polyphthalamides (PPA), and combinations of two or more of the foregoing.

The composition may contain aliphatic-aromatic polyamide in an amount of 5 weight percent to 80 weight percent based on the combined weight of poly(arylene ether), polyamide and impact modifier. Within this range the amount of aliphatic-aromatic polyamide may be greater than or equal to 10, or, more specifically, greater than or equal to 15 weight percent. Also within this range the amount of aliphatic-aromatic polyamide may be less than or equal to 70, or, more specifically, less than or equal to 60 weight percent.

The compatibilized poly(arylene ether)/aliphatic-aromatic polyamide blend is formed using a compatibilizing agent. When used herein, the expression "compatibilizing agent" refers to polyfunctional compounds which interact with the poly(arylene ether), the polyamide resin, or both. This interaction may be chemical (e.g., grafting) and/or physical (e.g., affecting the surface characteristics of the dispersed phases). In either instance the resulting compatibilized poly(arylene ether)/polyamide composition appears to exhibit improved compatibility, particularly as evidenced by enhanced impact strength, mold knit line strength and/or elongation. As used herein, the expression "compatibilized poly(arylene ether)/aliphatic-aromatic polyamide blend" refers to those compositions which have been physically and/or chemically compatibilized with a compatibilizing agent.

The compatibilizing agent comprises a polyfunctional compound that is one of two types. The first type has in the molecule both (a) a carbon-carbon double bond and b) at least one carboxylic acid, anhydride, epoxy, imide, amide, ester group or functional equivalent thereof. Examples of such polyfunctional compounds include maleic acid; maleic anhydride; fumaric acid; maleic hydrazide; dichloro maleic anhydride; and unsaturated dicarboxylic acids (e.g. acrylic acid, butenoic acid, methacrylic acid, t-ethylacrylic acid, pentenoic acid). In one embodiment, the compatibilizing agent comprises maleic anhydride and/or fumaric acid.

The second type of polyfunctional compatibilizing agent compounds are characterized as having both (a) a group represented by the formula (OR) wherein R is hydrogen or an alkyl, aryl, acyl or carbonyl dioxy group and (b) at least two groups each of which may be the same or different selected from carboxylic acid, acid halide, anhydride, acid halide anhydride, ester, orthoester, amide, imido, amino, and salts thereof. Typical of this type of compatibilizing agents are the aliphatic polycarboxylic acids, acid esters and acid amides represented by the formula:

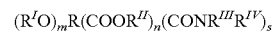

$(R^IO)_mR(COOR^{II})_n(CONR^{III}R^{IV})_s$ wherein R is a linear or branched chain saturated aliphatic hydrocarbon having 2 to 20, or, more specifically, 2 to t 10 carbon atoms; $R^I$ is hydrogen or an alkyl, aryl, acyl or carbonyl dioxy group having 1 to 10, or, more specifically, 1 to 6, or, even more specifically, 1 to 4 carbon atoms; each $R^{II}$ is independently hydrogen or an alkyl or aryl group having 1 to 20, or, more specifically, 1 to 10 carbon atoms; each $R^{III}$ and $R^{IV}$ are independently hydrogen or an alkyl or aryl group having 1 to 10, or, more specifically 1 to 6, or, even more specifically, 1 to 4, carbon atoms; m is equal to 1 and (n+s) is greater than or equal to 2, or, more specifically, equal to 2 or 3, and n and s are each greater than or equal to zero and wherein ($OR^I$) is alpha or beta to a carbonyl group and at least two carbonyl groups are separated by 2 to 6 carbon atoms. Obviously, $R^I$, $R^{II}$, $R^{III}$ and $R^{IV}$ cannot be aryl when the respective substituent has less than 6 carbon atoms.

Suitable polycarboxylic acids include, for example, citric acid, malic acid, agaricic acid; including the various commercial forms thereof, such as for example, the anhydrous and hydrated acids; and combinations comprising one or more of the foregoing. In one embodiment, the compatibilizing agent comprises citric acid. Illustrative of esters useful herein include, for example, acetyl citrate and mono-and/or distearyl citrates and the like. Suitable amides useful herein include, for example, N,N'-diethyl citric acid amide; N-phenyl citric acid amide; N-dodecyl citric acid amide; N,N'-didodecyl citric acid amide and N-dodecyl malic acid. Derivates include the salts thereof, including the salts with amines and the alkali and alkaline metal salts. Exemplary of suitable salts include calcium malate, calcium citrate, potassium malate, and potassium citrate.

The foregoing compatibilizing agents may be added directly to the melt blend or pre-reacted with either or both the poly(arylene ether) and polyamide. In one embodiment, at least a portion of the compatibilizing agent is pre-reacted, either in the melt or in a solution of a suitable solvent, with all or a part of the poly(arylene ether). It is believed that such pre-reacting may cause the compatibilizing agent to react with the polymer and, consequently, functionalize the poly (arylene ether). For example, the poly(arylene ether) may be pre-reacted with maleic anhydride, fumaric acid and/or citric acid to form an anhydride and/or acid functionalized polyphenylene ether which has improved compatibility with the polyamide compared to a non-functionalized polyphenylene ether.

In one embodiment a polycarboxylic acid is melt blended with a poly(arylene ether) to form a functionalized poly (arylene ether) which is pelletized. The functionalized poly (arylene ether) is then melt blended with the aliphatic-aromatic polyamide, impact modifier and optionally additional poly(arylene ether) to form the composition. Without being bound by theory it is believed that the additional melt blending allows for more functionalization of the poly(arylene ether) by the polycarboxylic acid which results in better compatibilization.

The amount of the compatibilizing agent used will be dependent upon the specific compatibilizing agent chosen and the specific polymeric system to which it is added.

In one embodiment, the compatibilizing agent is employed in an amount of 0.05 to 2.0 weight percent, based on the combined weight of poly(arylene ether), aliphatic-aromatic polyamide, and impact modifier. Within this range the amount of compatibilizing agent may be greater than or equal to 0.1, or, more specifically, greater than or equal to 0.2 weight percent. Also within this range the amount of compatibilizing agent may be less than or equal to 1.75, or, more specifically, less than or equal to 1.5 weight percent.

The composition further comprises an impact modifier. Useful impact modifiers include block copolymers of an alkenyl aromatic compound and a conjugated diene, hydrogenated block copolymers of an alkenyl aromatic compound and a conjugated diene, functionalized elastomeric polyolefins and combinations comprising two or more of the foregoing.

The block copolymers are copolymers comprising (A) at least one block derived from an alkenyl aromatic compound and (B) at least one block derived from a conjugated diene. Hydrogenated block copolymers are those in which the aliphatic unsaturated group content in the block (B) is reduced by hydrogenation. The arrangement of blocks (A) and (B) includes a linear structure and a so-called radial teleblock structure having branched chains.

Preferred of these structures are linear structures embracing diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of A and B. More preferred are diblock, triblock, and tetrablock structures, with the A-B diblock and A-B-A triblock structures being particularly preferred.

The alkenyl aromatic compound providing the block (A) is represented by formula:

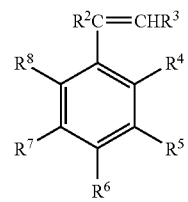

wherein $R^2$ and $R^3$ each independently represent a hydrogen atom, a $C_1$–$C_8$ alkyl group, a $C_2$–$C_8$ alkenyl group, or the like; $R^4$ and $R^8$ each independently represent a hydrogen atom, a $C_1$–$C_8$ alkyl group, a chlorine atom, a bromine atom, or the like; and $R^5$–$R^7$ each independently represent a hydrogen atom, a $C_1$–$C_8$ alkyl group, a $C_2$–$C_8$ alkenyl group, or the like, or $R^4$ and $R^5$ are taken together with the central aromatic ring to form a naphthyl group, or $R^5$ and $R^6$ are taken together with the central aromatic ring to form a naphthyl group.

Specific examples, of the alkenyl aromatic compounds include styrene, p-methylstyrene, alpha-methylstyrene, vinylxylenes, vinyltoluenes, vinylnaphthalenes, divinylbenzenes, bromostyrenes, chlorostyrenes, and the like, and combinations comprising at least one of the foregoing alkenyl aromatic compounds. In one embodiment the alkenyl aromatic compound is selected from styrene, alpha-methylstyrene, p-methylstyrene, vinyltoluenes, and vinylxylenes. In another embodiment the alkenyl aromatic compound is styrene.

Specific examples of the conjugated diene include 1,3-butadiene, 2-methyl-1,3-butadiene, 2,3-dimethyl-1,3-butadiene, 1,3-pentadiene, and the like. Preferred among them are 1,3-butadiene and 2-methyl-1,3-butadiene, with 1,3-butadiene being more preferred.

In addition to the conjugated diene, the hydrogenated block copolymer may contain a small proportion of a lower olefinic hydrocarbon such as, for example, ethylene, propylene, 1-butene, dicyclopentadiene, a non-conjugated diene, or the like.

There is no particular restriction on the content of the repeating unit derived from the alkenyl aromatic compound in the block copolymers. Suitable alkenyl aromatic content may be 10 to 90 weight percent based on the total weight of the block copolymer. Within this range, the alkenyl aromatic content may be greater than or equal to 40 weight percent, or, more specifically, greater than or equal to 50 weight percent, or, even more specifically, greater than or equal to 55 weight percent. Also within this range, the alkenyl aromatic content may be less than or equal to 85 weight percent, or, more specifically, less than or equal to 75 weight percent.

There is no particular limitation on the mode of incorporation of the conjugated diene in the hydrogenated block copolymer backbone. For example, when the conjugated diene is 1,3-butadiene, it may be incorporated with 1% to 99% 1,2-incorporation with the remainder being 1,4-incorporation.

The hydrogenated block copolymer is preferably hydrogenated to such a degree that fewer than 50%, or, more specifically fewer than 20%, or, even more specifically, fewer than 10%, of the unsaturated bonds in the aliphatic chain moiety derived from the conjugated diene remain unreduced. The aromatic unsaturated bonds derived from the alkenyl aromatic compound may be hydrogenated to a degree of up to 25%.

The hydrogenated block copolymer may have a number average molecular weight of 5,000 to 500,000 AMU, as determined by gel permeation chromatography (GPC) using polystyrene standards. Within this range, the number average molecular weight may be at least 10,000 AMU, or more specifically greater than or equal to 30,000 AMU, or, even more specifically, greater than or equal to 45,000 AMU. Also within this range, the number average molecular weight may less than or equal to 300,000 AMU, or, more specifically less than or equal to 200,000 AMU, or, even more specifically, less than or equal to up to 150,000 AMU.

The molecular weight distribution of the hydrogenated block copolymer as measured by GPC is not particularly limited. The copolymer may have any ratio of weight average molecular weight to number average molecular weight.

Exemplary hydrogenated block copolymers are the styrene-(ethylene-butylene) diblock and styrene-(ethylene-butylene)-styrene triblock copolymers obtained by hydrogenation of styrene-butadiene and styrene-butadiene-styrene triblock copolymers, respectively.

Suitable hydrogenated block copolymers include those commercially available as, for example, KRATON® G1650, G1651, and G1652 available from Kraton Polymers (formerly a division of Shell Chemical Company), and TUFTEC® H1041, H1043, H1052, H1062, H1141, and H1272 available from Asahi Chemical.

Exemplary non-hydrogenated block copolymers include polystyrene-polybutadiene, polystyrene-poly(ethylene-propylene), polystyrene-polyisoprene, poly(α-methylstyrene)-polybutadiene, polystyrene-polybutadiene-polystyrene (SBS), polystyrene-poly(ethylene-propylene)-polystyrene, polystyrene-polyisoprene-polystyrene and poly(alpha-methylstyrene)-polybutadiene-poly(alpha-methylstyrene), as well as combinations of the foregoing.

Suitable non-hydrogenated block copolymers are available commercially from a number of sources, including Phillips Petroleum under the trademark SOLPRENE, Shell Chemical Co., under the trademark KRATON, Dexco under the trademark VECTOR, and Kuraray under the trademark SEPTON.

Other useful impact modifiers include functionalized elastomeric polyolefins. Functionalized elastomeric polyolefins contain at least one functional group selected from the group consisting of carboxylic acid groups, esters, acid anhydrides, epoxy groups, oxazoline groups, carbodiimide groups, isocyanate groups, silanol groups, carboxylates, and combinations of two or more of the foregoing functional groups. The elastomeric polyolefin is a polyolefin miscible with the polyamide and includes linear random copolymers, linear block copolymer and core-shell type copolymers wherein the shell is miscible with polyamide and comprises a functional group reactive with the polyamide. Exemplary polyolefins include polyethylene, ethylene-vinyl acetate copolymer (EVA), ethylene-ethylacrylate copolymer (EEA), ethylene-octene copolymer, ethylene-propylene copolymer, ethylenebutene copolymer, ethylene-hexene copolymer, or ethylene-propylene-diene terpolymers. Monomers comprising the functional group may be graft-polymerized with the polyolefin or co-polymerized with the polyolefin monomers. In one embodiment the structural units of the elastomeric polyolefin are derived from ethylene and at least one $C_{3-8}$ olefin, such as, propylene, 1-butene, 1-hexene, and 1-octene.

Suitable functionalized elastomeric polyolefins are available commercially from a number of sources, including DuPont under the trademark ELVALOY.

The selection of the type of impact modifier or combination of types of impact modifier, may be based, at least in part, on the melt temperature of the polyamide and the temperature profile of the impact modifier.

The composition may comprise the impact modifier in an amount of 3 to 30 weight percent, based on the combined weight of poly(arylene ether), polyamide and impact modifier. Within this range the amount of impact modifier may be greater than or equal to 4, or, more specifically greater than or equal to 5 weight percent. Also within this range the amount of impact modifier may be less than or equal to 25, or, more specifically less than or equal to 20 weight percent.

The composition can be prepared melt mixing or a combination of dry blending and melt mixing. Melt mixing can be performed in single or twin screw type extruders or similar mixing devices which can apply a shear to the components.

All of the ingredients may be added initially to the processing system. In one embodiment, the poly(arylene ether), optionally other ingredients such as an impact modifier, and optionally a portion of the polyamide may be precompounded with the compatibilizing agent. When the polyamide is added in two portions, the remaining portion of the polyamide is added after the first ingredients have been mixed. When using an extruder, the second portion of polyamide may be fed through a port downstream. While separate extruders may be used in the processing, preparations in a single extruder having multiple feed ports along its length to accommodate the addition of the various components simplifies the process. It is often advantageous to apply a vacuum to the melt through one or more vent ports in the extruder to remove volatile impurities in the composition.

The composition may further comprise effective amounts of at least one additive selected from the group consisting of anti-oxidants, flame retardants, drip retardants, dyes, pigments, colorants, stabilizers, small particle mineral such as clay, mica, and talc, reinforcing agents, electrically conductive filler, antistatic agents, plasticizers, lubricants, blowing agents and mixtures thereof. These additives are known in the art, as are their effective levels and methods of incorporation. Effective amounts of the additives vary widely, but they are usually present in an amount up to about 50% or more by weight, based on the weight of the entire composition. Some additives such as hindered phenols, thio compounds and amides derived from various fatty acids are generally present in amounts 2% total combined weight based on the total weight of the composition.

Exemplary flame retardants include halogenated flame retardants; organic phosphates including cyclic phosphates; compounds containing phosphorus-nitrogen bonds, such as phosphonitrilic chloride, phosphorus ester amides; phosphoric acid amides, phosphonic acid amides, phosphinic acid amides, tris(aziridinyl) phosphine oxide; tetrakis(hydroxymethyl) phosphonium chloride; mono-, di-, and polymeric phosphinates, magnesium hydroxide, magnesium carbonate, red phosphorus; melamine polyphosphate; melem phosphate, melam phosphate; melamine pyrophosphate; melamine; melamine cyanurate; zinc compounds such as zinc borate; and combinations comprising at least one of the foregoing. Flame retardants are typically used in amounts sufficient to provide the composition with sufficient flame retardance to pass a proscribed flame retardancy standard such as Underwriter's Laboratory Bulletin 94 entitled "Tests for Flammability of Plastic Materials, UL94". The relevant flame retardancy standard may be determined by the final application.

Compositions of the invention may be converted to articles using common thermoplastic processes such as film and sheet extrusion, injection molding, gas-assist injection molding, extrusion molding, compression molding and blow molding. Film and sheet extrusion processes may include and are not limited to melt casting, blown film extrusion and calendaring. Co-extrusion and lamination processes may be employed to form composite multi-layer films or sheets. Single or multiple layers of coatings may further be applied to the single or multi-layer substrates to impart additional properties such as scratch resistance, ultra violet light resistance, aesthetic appeal, etc. Coatings may be applied through standard application techniques such as rolling, spraying, dipping, brushing, or flow-coating. Film and sheet of the invention may alternatively be prepared by casting a solution or suspension of the composition in a suitable solvent onto a substrate, belt or roll followed by removal of the solvent.

Oriented films may be prepared through blown film extrusion or by stretching cast or calendared films in the vicinity of the thermal deformation temperature using conventional stretching techniques. For instance, a radial stretching pantograph may be employed for multi-axial simultaneous stretching; an x-y direction stretching pantograph can be used to simultaneously or sequentially stretch in the planar x-y directions. Equipment with sequential uniaxial stretching sections can also be used to achieve uniaxial and biaxial stretching, such as a machine equipped with a section of differential speed rolls for stretching in the machine direction and a tenter frame section for stretching in the transverse direction.

Compositions of the invention may be converted to multiwall sheet comprising a first sheet having a first side and a second side, wherein the first sheet comprises a thermoplastic polymer, and wherein the first side of the first sheet is disposed upon a first side of a plurality of ribs; and a second sheet having a first side and a second side, wherein the second sheet comprises a thermoplastic polymer, wherein the first side of the second sheet is disposed upon a second side of the plurality of ribs, and wherein the first side of the plurality of ribs is opposed to the second side of the plurality of ribs.

The films and sheets described above may further be thermoplastically processed into shaped articles via forming and molding processes including but not limited to thermoforming, vacuum forming, pressure forming, injection molding and compression molding. Multi-layered shaped articles may also be formed by injection molding a thermoplastic resin onto a single or multi-layer film or sheet substrate as described below:

1. Providing a single or multi-layer thermoplastic substrate having optionally one or more colors on the surface, for instance, using screen printing or a transfer dye
2. Conforming the substrate to a mold configuration such as by forming and trimming a substrate into a three dimensional shape and fitting the substrate into a mold having a surface which matches the three dimensional shape of the substrate.
3. Injecting a thermoplastic resin into the mold cavity behind the substrate to (i) produce a one-piece permanently bonded three-dimensional product or (ii) transfer a pattern or aesthetic effect from a printed substrate to the injected resin and remove the printed substrate, thus imparting the aesthetic effect to the molded resin.

Those skilled in the art will also appreciate that common curing and surface modification processes including and not limited to heat-setting, texturing, embossing, corona treatment, flame treatment, plasma treatment and vacuum deposition may further be applied to the above articles to alter surface appearances and impart additional functionalities to the articles.

Accordingly, another embodiment of the invention relates to articles, sheets and films prepared from the compositions above.

The following non-limiting examples further illustrate the various embodiments described herein.

EXAMPLES

The following examples were prepared using the materials listed in Table I. The examples also contain less than 1 weight percent stabilizers and anti-oxidants. Weight percent, as used in the examples, was determined based on the total weight of the composition.

TABLE I

| Material Name | Material Description/Supplier |
| --- | --- |
| PPE | A polyphenylene ether with an intrinsic viscosity of 0.46 dl/g as measured in chloroform at 25° C. and has a glass transition temperature of 205–210° C. |
| SEBS | Polystyrene-poly(ethylene-butylene)-polystyrene impact modifier commercially available from Kraton Polymers as G 1651. |
| PA9T | An aliphatic-aromatic polyamide having an amine end group content of 80 micromoles per gram of polyamide; a melt viscosity of 300 Pa-s at a shear rate of 1000 $s^{-1}$ and 330° C., and a melt temperature of 300° C. |
| PA I | An aliphatic polyamide having a melt temperature of 230° C. and a melt viscosity of 136 Pa-s at a shear rate of 1500 $s^{-1}$ and 270° C. The polyamide is commercially available from Custom Resins as NX4512. |

TABLE I-continued

| Material Name | Material Description/Supplier |
|---|---|
| PA II | An aliphatic polyamide having a melt temperature of 265–275° C. and a melt viscosity of 38 Pa-s at a shear rate of 1500 s$^{-1}$ and 300° C. The polyamide is commercially available from Solution as Vydyne 21Z. |
| Citric acid | Available from Cargill |
| Fumaric acid | Available from Asland Chemical |

Examples 1–3

Poly(arylene ether), impact modifier, and either citric acid or fumaric acid (as shown in Table II) were added at the feed throat of a 30 millimeter Werner and Pfleider twin screw extruder and melt mixed at a screw speed of 350 rotations per minute and a feed rate of 13.6 kilograms per hour and a temperature of 305° C. The polyamide was added downstream. Melt viscosity was determined by capillary viscometry. Formulations and results are shown in Table II.

TABLE II

| Component | 1* | 2* | 3 |
|---|---|---|---|
| PPE | 38.6 | 38.6 | 38.6 |
| PA9T | — | — | 50 |
| PA I | 50 | — | — |
| PA II | — | 50 | — |
| SEBS | 10 | 10 | 10 |
| Citric Acid | 1.1 | 1.1 | — |
| Fumaric Acid | — | — | 0.5 |
| Melt viscosity at 1500 s$^{-1}$ and 282° C. | — | 130 | — |
| Melt viscosity at 1500 s$^{-1}$ and 315° C. | 150 | — | — |
| Melt viscosity at 1500 s$^{-1}$ and 330° C. | — | — | 214.4 |

*Comparative Example

The melt viscosity of the foregoing examples were determined at the temperatures appropriate to each composition. Despite the differences in temperature comparisons may be made when it is taken into account that the melt viscosity will decrease as temperature increases. Example 1 is a composition that has a high melt viscosity and comprises an aliphatic polyamide with a high melt viscosity and a melt temperature 20–25 degrees higher than the glass transition temperature of the poly(arylene ether). Example 2 is a composition with a low melt viscosity and comprises an aliphatic polyamide with a low melt viscosity and a high melt temperature. In contrast Example 3 is a composition with a surprisingly high melt viscosity and comprises an aliphatic-aromatic polyamide with a high melt viscosity and a high melt temperature.

While the invention has been described with reference to various embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

All cited patents are incorporated by reference herein.

The invention claimed is:

1. A composition comprising:
   an impact modifier; and
   a compatibilized blend of a poly(arylene ether) and an aliphatic-aromatic polyamide wherein, prior to forming the compatibilized blend, the aliphatic-aromatic polyamide has an amine end group content greater than 45 micromoles per gram of polyamide and the aliphatic-aromatic polyamide comprises
      units derived from a dicarboxylic acid wherein 60 to 100 mol % of units derived from a dicarboxylic acid are derived from terephthalic acid, and
      units derived from a diamine wherein 60 to 100 mol % of the units derived from a diamine are derived from 1,9-nonanediamine 2-methyl-1,8-octanediamine or a combination of 1,9-nonanediamine and 2-methyl-1,8-octanediamine
   and further wherein the aliphatic-aromatic polyamide has a melt viscosity greater than or equal to 200 Pascal seconds at a shear of 1000 second$^{-1}$ and a temperature of 330° C. and the composition has a melt viscosity of 160 to 350 Pascal seconds at a shear of 1500 second$^{-1}$ (s$^{-1}$) and a temperature of 330° C.

2. The composition of claim 1 wherein the composition has a coefficient of thermal expansion of 6×10$^{-5}$ millimeters/millimeters °C. to 9×10$^{-5}$ millimeters/millimeters °C. as determined by ISO 11359-2 and reported at 23–60° C.

3. The composition of claim 1 wherein the composition has a water absorption value less than or equal to 0.30% after 24 hours as determined by as determined by ASTM D 570.

4. The composition of claim 1 wherein the composition has a Notched Izod value at 23° C. greater than or equal to 650 Joules per meter, as measured by ASTM D 256.

5. The composition of claim 1 wherein the composition has a multi-axial impact value at 23° C. greater than or equal to 50 Joules, as measured by ASTM D 3763.

6. The composition of claim 1, wherein the composition, in the absence of filler and/or reinforcing agent, has a multi-axial loss less than or equal to 0.30, determined using multi-axial impact values measured according to ASTM D3763.

7. The composition of claim 1, wherein the poly(arylene ether) is present in an amount of 10 to 70 weight percent, the aliphatic-aromatic polyamide is present in an amount of 5 to 80 weight percent, based on the combined weight of poly(arylene ether), aliphatic-aromatic polyamide and impact modifier.

8. The composition of claim 1, wherein the molar ratio of 1,8-nonanediamine to 2-methyl-1,8-octanediamine is 100:0 to 20:80.

9. The composition of claim 1, wherein the amine end group content is greater than or equal to 50 micromoles.

10. The composition of claim 1, wherein the aliphatic-aromatic polyamide has an intrinsic viscosity of 0.7 to 1.8 dl/g when measured in concentrated sulfuric acid.

11. The composition of claim 1, wherein the compatibilized blend of a poly(arylene ether) and an aliphatic-aromatic polyamide further comprises an aliphatic polyamide.

12. The composition of claim 1, wherein the compatibilized blend of poly(arylene ether) and an aliphatic-aromatic polyamide is the reaction product of a poly(arylene ether), an aliphatic-aromatic polyamide, and a compatibilizing agent selected from polyfunctional compounds having both a carbon-carbon double bond and at least one carboxylic acid, anhydride, epoxy, imide, amide, ester group or functional equivalent thereof polyfunctional compounds having both a group represented by the formula (OR) wherein R is hydrogen or an alkyl, aryl, acyl or carbonyl dioxy group and at least two groups each of which may be the same or different selected from carboxylic acid, acid halide, anhydride, acid halide anhydride, ester, orthoester, amide, imido, amino, and salts thereof and combinations of two or more of the foregoing polyfunctional compounds.

13. The composition of claim 12, wherein the compatibilizing agent comprises citric acid, fumaric acid, maleic anhydride or a combination of two or more of the foregoing.

14. The composition of claim 1, wherein the impact modifier comprises a block copolymer of an alkenyl aromatic compound and a conjugated diene, a hydrogenated block copolymer of an alkenyl aromatic compound and a conjugated diene, a functionalized elastomeric polyolefin or a combination of two or more of the foregoing.

15. The composition of claim 1, wherein the impact modifier is present in an amount of 3 to 30 weight percent, based on the combined weight of poly(arylene ether), aliphatic-aromatic polyamide and impact modifier.

16. The composition of claim 1, further comprising an anti-oxidant, flame retardant, drip retardant, dye, pigment, colorant, stabilizer, small particle mineral, reinforcing agent, electrically conductive filler, antistatic agent, plasticizer, lubricant, blowing agent or a mixtures comprising two or more of the foregoing.

* * * * *

UNITED STATES PATENT AND TRADEMARK OFFICE
CERTIFICATE OF CORRECTION

PATENT NO.         : 7,118,691 B2
APPLICATION NO. : 10/909078
DATED               : October 10, 2006
INVENTOR(S)      : Mark Elkovitch et al.

It is certified that error appears in the above-identified patent and that said Letters Patent is hereby corrected as shown below:

Column 4, Line 59: after "adipic acid", delete "2-trimethyladipic acid" and insert therefor --2-methyladipic acid, trimethyladipic acid--.

Column 14, Line 32: after "to", delete "0.30%" and insert therefor --0.3%--.

Column 15, Line 2: after "thereof", insert --;--.
Line 8: after "thereof", insert --;--.

Signed and Sealed this

Sixth Day of March, 2007

JON W. DUDAS
*Director of the United States Patent and Trademark Office*